United States Patent [19]

Scheider et al.

[11] Patent Number: 5,318,603

[45] Date of Patent: Jun. 7, 1994

[54] ABRASIVE FILAMENT HONING TOOL AND METHOD OF MAKING AND USING SAME

[75] Inventors: Alfred F. Scheider, Orange; R. Brown Warner, Westlake, both of Ohio

[73] Assignee: Jason, Inc., Cleveland, Ohio

[21] Appl. No.: 970,865

[22] Filed: Nov. 3, 1992

Related U.S. Application Data

[63] Continuation-in-part of Ser. No. 508,060, Apr. 11, 1990, Pat. No. 5,216,847, which is a continuation-in-part of Ser. No. 228,438, Aug. 5, 1988, Pat. No. 5,129,191.

[51] Int. Cl.⁵ ............................................. B24D 9/00
[52] U.S. Cl. ..................................... 51/293; 51/297; 51/330; 51/334
[58] Field of Search ............... 51/293, 297, 298, 330, 51/334, 336, 337, 338, 349, 180 NT; 300/21; 15/159 R, 179, 136, 190, 192, 193, 191 R, 51, 300

[56] References Cited

U.S. PATENT DOCUMENTS

| | | | |
|---|---|---|---|
| 2,049,324 | 7/1936 | Schneider | 51/337 |
| 2,488,873 | 11/1949 | Maynard | 300/21 |
| 2,934,777 | 5/1960 | Hansel | 15/193 |
| 2,982,983 | 5/1961 | Peterson | 300/21 |
| 3,237,234 | 3/1966 | Tilgner | 300/21 |
| 3,577,839 | 5/1971 | Charvat et al. | 51/400 |
| 3,798,699 | 3/1974 | Lewis, Jr. | 300/21 |
| 4,133,147 | 1/1979 | Swift, Jr. | 51/400 |
| 4,635,313 | 1/1987 | Fassler et al. | 300/21 |

FOREIGN PATENT DOCUMENTS 3719796  12/1988  Fed. Rep. of Germany ........ 51/334

*Primary Examiner*—M. Rachuba
*Attorney, Agent, or Firm*—Renner, Otto, Boisselle & Sklar

[57] ABSTRACT

A honing tool characterized in one form by an elongated rectangular cup element or holder having a bottom interior surface, a bundle of closely packed relatively short discrete generally parallel abrasive containing filaments secured in the holder, and a layer of instant gel adhesive securing all of the filaments at one end face of the bundle to the bottom interior surface of the holder. To make such a honing tool, a measured bundle of uniformly closely packed nonwoven, generally parallel discrete filaments is formed. A holder is supported and a measured amount of gel adhesive is placed in the bottom interior of the holder so that a layer of such adhesive completely covers the bottom of the interior of the holder. The bundle is then promptly driven into the holder so that all of the filaments at one end of the bundle are in contact with the adhesive prior to the curing of the adhesive. The adhesive is then cured. In another form a rectangular bundle of abrasive containing strips is formed, each having a slit or scored lateral edge. The plastic strips may be formed into bundles by ultrasonic welding through the unslit or unscored root portions of each strip. The bundle is driven into the holder to be secured by the gel adhesive in the same manner. In either form there is produced a rectangular or oblong honing tool which is provided with relatively short fingers closely packed not only within the holder but also at the working face. The improved tool has a somewhat soft or flexible working face as compared to a conventional honing stone or clad steel tool and will not contaminate the surface being honed. The tool provides an improved surface topography whether used as a finish hone or in a tertiary operation.

26 Claims, 5 Drawing Sheets

ABRASIVE FILAMENT HONING TOOL AND METHOD OF MAKING AND USING SAME

RELATED APPLICATIONS

This application is a continuation-in-part of application Ser. No. 07/508,060 filed Apr. 11, 1990 entitled "Abrasive Filament Honing Tool And Method Of Making And Using Same", now U.S. Pat. No. 5,216,847, which is in turn a continuation-in-part of applicants' co-pending application entitled "Adhesive Bonded Flexible Abrasive Finishing Tool", Ser. No. 228,438, filed Aug. 5, 1988, now U.S. Pat. No. 5,129,191, the entire disclosures of which are hereby incorporated by reference.

DISCLOSURE

This invention relates generally as indicated to an abrasive filament honing tool including a method of making and using the same, and more particularly to a honing tool including a bundle of discrete filaments which affords improved surface topography whether used as a finish hone or in a tertiary operation.

BACKGROUND OF THE INVENTION

A honing machine is commonly used for finishing a bore in a workpiece. When a workpiece, such as a cylinder, is bored out, the boring tool leaves V-shaped grooves in the surface of the cylinder wall, much like those on a phonograph record. The sharp peaks of these ridges are rounded off by honing the bore. The typical honing machine uses a set of honing tools spaced around a machine head and fed progressively outwardly against a generally cylindrical internal wall of a workpiece while the machine head is simultaneously rotated within and reciprocated along the workpiece. In this manner, the working face of each honing tool is forced into engagement with the wall under selected honing pressure to abrade and finish the wall.

The specific honing tools usually include a honing element secured in a holder. This honing element is commonly a one-piece element, and in fact is usually referred to as a "honing stone". Examples of such honing elements are described in prior U.S. Pat. Nos. 3,829,299; 2,980,524; 3,352,067; 3,154,893; 3,132,451; 4,528,776; 4,555,875; 3,972,161; and 3,918,218. In the latter two patents, a plurality of cutting filaments are embedded in a matrix, however the resulting honing element is nonetheless a one-piece relatively rigid element.

In the course of honing, it is common for chips or burns to be knocked loose from the cylinder. Because of the solid structure of most honing elements, no clearance is present between the wall and the working face of the honing element. These chips may wedge themselves between the working face of the honing element and the wall. Although a liquid is usually flushed through the bore during honing, such has little effect on the wedged chips. Eventually, either the wall or the honing element must give, resulting in the damage of a honing element or stone and/or the scarring of a bore of what may be an expensive cylinder.

It is also not uncommon for a rigid honing tool to embed a hard abrasive grain in the surface being honed. If this contamination occurs, excessive piston ring wear results, which in an internal combustion engine leads to "blow by" which results in environmental problems.

Also many bores such as engine bores have lateral ports. Conventional honing stones or tools cannot radius or finish the edges of such ports. Thus a need remains for an improved honing tool providing improved surface finish.

During recent years, to correct these problems and to improve upon the final finishing results, a second honing head was added to a few high production automotive engine block lines directly after the rough and finishing honing operation. The honing tools used were superabrasives plated on very fine wire filaments, lightly filled, and fine abrasive nylon brushes. Results of this added operation have been questionable based upon quality improvements and economic justification.

A second head brush hone using very fine spaced bristles may be seen in European Patent Publication 0 247 572. A post hone brushing machine is also seen in U.S. Pat. No. 5,042,202. In U.S. Pat. No. 4,980,996 there is illustrated a machine using tufted spaced bristles in combination with a high pressure spray or jet to remove metal nap after honing. In a related patent, an option of using bristles in ring holders is disclosed as seen in U.S. Pat. No. 5,085,014.

Also recently used in post honing second station operations are honing tools of the type shown in the parent application of Scheider and Warner, Ser. No. 07/508,060, entitled "Abrasive Filament Honing Tool And Method Of Making And Using The Same", filed Dec. 14, 1989. The tool of this copending application comprises tightly packed nylon-abrasive filaments which form a dense and compact slightly yieldable face. Such tool has been performing adequately in post honing, second station operations to improve honed surfaces.

SUMMARY OF THE INVENTION

The present invention provides a honing tool which affords better chip clearance and an improved surface finish by using a bundle of discrete filaments or fingers cut from strips as its honing elements. The honing tool includes a cup element in the form of a rectangular holder having a bottom interior surface, a bundle of closely packed discrete generally parallel filaments or strips secured in the holder, and a layer of instant gel adhesive securing all of the filaments or strips at one end face of the bundle to the bottom interior surface of the holder.

To make such a honing tool, a measured bundle of strips or uniformly closely packed nonwoven, generally parallel discrete filaments is formed. A cup element or holder is supported and a measured amount of liquid or gel adhesive is placed in the bottom interior of the cup element so that a layer of such adhesive completely covers the bottom of the interior of the cup element. The bundle is then promptly driven into the cup element so that all of the filaments or strips at one end of the bundle are in contact with the adhesive prior to the curing of the adhesive. The adhesive is then cured whereby the one end face of the bundle is secured to the bottom interior of the cup element or holder.

If a bundle of strips is employed, one lateral edge will be slit or scored before forming the bundle as by sonic welding for example. The uncut or slit lateral edges form the root of the strip bundle to be driven into the cup and secured by the adhesive. The uncut portions are within the cup while the cut or scored edges form a dense closely packed uniform tool face projecting a short distance from the cup. The strip and prebundling process simplifies the formation of the tool.

In another embodiment a bundle of relatively short filaments is cut to length and formed before being driven into the holder and the adhesive. In other embodiments the process steps of slitting, in the case of the strips, cutting, bundling and driving into the cup may be essentially automated.

To the accomplishment of the foregoing and related ends the invention, then, comprises the features hereinafter fully described and particularly pointed out in the claims, the following description and the annexed drawings setting forth in detail certain illustrative embodiments of the invention, these being indicative, however, of but a few of the various ways in which the principles of the invention may be employed.

DETAILED DESCRIPTION OF THE PREFERRED EMBODIMENTS

Figure 1:
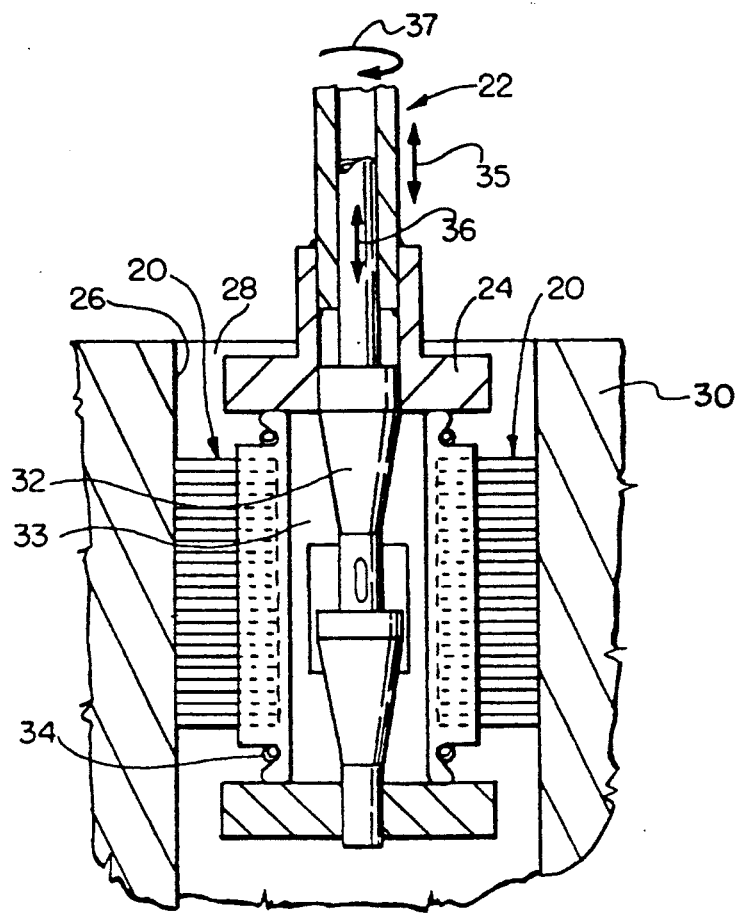
FIG. 1 is a fragmentary side elevation of an abrasive filament honing machine head employing a honing tool according to the present invention, parts of the machine and the associated workpiece being shown in cross-section.

Referring now to the drawings in detail and initially to FIG. 1, a honing tool 20 according to the present invention is shown installed in a typical honing machine head 22. The honing machine head 22 uses a set of honing tools spaced around a body 24 and fed progressively radially outwardly into a generally cylindrical internal wall 26 of the bore 28 of a workpiece 30. The body 24 includes a wedge cone 32 and a follower 33 for each honing tool 20. The honing tools 20 and followers 33 are assembled to the body 24 by garter springs 34. In operation, the body 24 is reciprocated axially within the bore 28 as indicated schematically by arrow 35. The wedge cones 32 are reciprocated as shown by arrow 36 radially to expand and contract the honing tools 20, thereby maintaining the outer working face of each honing tool 20 in engagement with the wall 26 under selected honing pressure. Simultaneously, the body 24 is rotated within the bore 28 as indicated by arrow 37 thereby abrading and finishing the wall 26.

Figure 2:
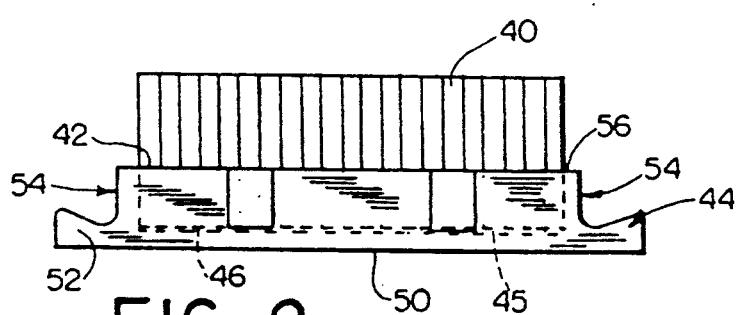
FIG. 2 is a side view of a honing tool which employs filaments of a rectangular transverse cross-section.
Figure 3:
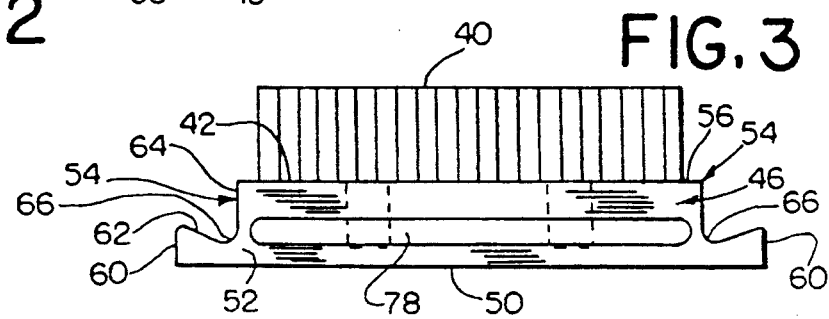
FIG. 3 is a rear side view of the honing tool but showing a modified holder.
Figure 4:
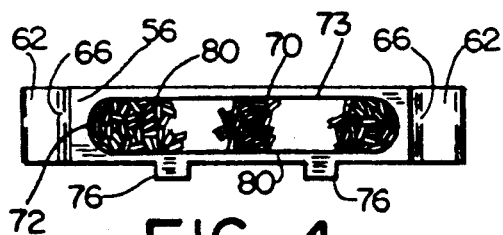
FIG. 4 is a top view of the honing tool of FIG. 2 showing the closely packed tip face.
Figure 5:
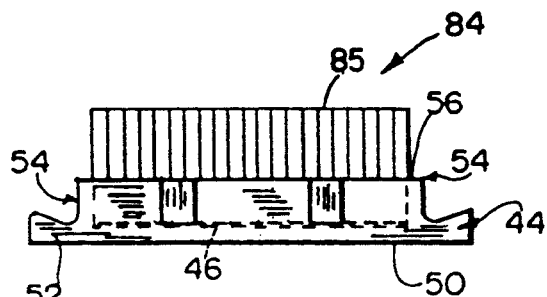
FIG. 5 is a side view of a honing tool which uses filaments formed by slits from one edge of an abrasive containing plastic strip.

Referring now additionally to FIGS. 2–4, the honing tool 20 is shown in detail. The honing tool 20 comprises a relatively short bundle 40 of plastic abrasive loaded filaments or monofilaments and a rectangular cup element 42 which is an integral part of a holder 44. The bundle 40 is bonded to the bottom surface or wall 45 of the cup element 42 by a liquid or gel instant adhesive seen at 46.

The holder 44 is roughly rectangular in section its length being at least twice its width. The length may exceed the width by four to ten times or more and provides a rigid beam for application of the tool face to the wall 26. The holder may be formed of metal or of a non-brittle plastic such as nylon. The holder 44 includes a flat bottom wall 50, two side walls 52, two end walls 54 and a top wall 56. The side walls 52 are generally straight and connect the top wall 50 to the bottom wall 56. The end walls 54 are curved and include outer straight section 60 adjacent to the bottom surface, an inwardly and downwardly sloped section 62, adjacent straight section 60 and an inner straight section 64 adjacent the section 62. The sections 62 and 64 together form an inner corner 66, which may serve as resting point for a garter spring, such as the garter spring 34 shown in FIG. 1.

The top wall 56 is the same width but is not as long as the bottom wall 50. As indicated above, the cup element 42 is an integral part of the holder 44. Specifically, the cup element extends downward from the top wall 56 extending a substantial portion of the height of the holder, but terminating short of the bottom wall 50. The cup element 42 has two flat sides 70 connected by two rounded ends 72, the sides and corners together forming an oblong opening 73. One side wall 52 includes two spacers 76. In the holder shown in FIG. 3, the side wall 52 may include one or more slots 78 through which instant adhesive in a gel form may be injected.

The bundle 40 illustrated may preferably comprise plastic abrasive loaded filaments or monofilaments 80 having a rectangular transverse cross-section as shown in FIG. 4. Each filament has a width and a thickness.

Typically, the rectangular filament 80 at its major flat face may be approximately 0.090 inch wide and about 0.045 inch thick. Somewhat wider rectangular filaments may be employed having major flat faces up to three to four times the thickness of the filament. The width is preferably not greater than four times the thickness, more preferably the width is not greater than three times the thickness and still more preferably the width is approximately twice the thickness. The length of the monofilament, projecting from the holder, is at least ten times greater than the width, and more preferably at least twenty times greater than the width. The projection from the holder is nonetheless relatively short.

The monofilament may be extruded plastic impregnated throughout uniformly with an abrasive mineral such as aluminum oxide or silicon carbide. Other more exotic abrasive minerals may readily be employed such as polycrystalline diamond. Also, the abrasive grit size may be varied from coarse to fine powders for extra fine polishing and highlighting effects on work parts.

The plastic material preferably has a Young's modulus greater than 0.10 at $10^6$ psi and more preferably greater than 0.40 at $10^6$ psi. Young's modulus is defined as the amount of force a material can undergo without permanent deformation when the force is removed. This is a measure of elasticity or the relationship of stress over strain.

The preferred plastic for extrusion of the monofilament working element is nylon. The preferred nylon is 6/12 nylon. Nylons are long-chain partially crystalline synthetic polymeric amides (polyamides). Polyamides are formed primarily by condensation reactions of diamines and dibasic acids or a material having both the acid and amine functionality.

Nylons have excellent resistance to oils and greases, in solvents and bases. Nylons have superior performance against repeated impact, abrasion, and fatigue. Other physical properties include a low coefficient of friction, high tensile strength, and toughness. Useful mechanical properties of nylon include strength, stiffness and toughness. In general, the greater the amount of amide linkages, the greater the stiffness, the higher the tensile strength, and the higher the melting point. Several useful forms of nylon are available and include:
A. Nylon 6/6 synthesized from hexamethylenediamine (HMD) and adipic acid;
B. Nylon 6/9 synthesized from HMD and azelaic acid;
C. Nylon 6/10 synthesized from HMD and sebacic acid;
D. Nylon 6/12 synthesized from HMD and dodecanedioic acid;
E. Nylon 6 synthesized from polycaprolactam;
F. Nylon 11 synthesized from 11-aminoundecanoic acid;
G. Nylon 12 synthesized from polyaurolactam; and others.

Nylons useful in the present invention have a Young's modulus greater than 0.05, preferably greater than 0.1 and preferably greater than 0.2.

The preferred nylon is nylon 6/12. The physical properties of nylon 6/12 include a melting point of 212° C., a dry yield strength at $10^3$ psi of 8.8 (7.4 at 50% RH), a dry flexural modulus of 295 (180 at 50% RH). Nylon has a higher Young's modulus (0.40 at $10^6$ psi) than rubber (0.01 at $10^6$ psi), which demonstrates the greater stiffness of nylon over an elastomer such as rubber, for example. As an example, a working element according to the present invention several feet long when held horizontally at one end at room temperature would show little or minimal deflection at the opposite end.

Nylon is partially crystalline, hence has little or no rubbery regions during deformation. The degree of crystallinity determines the stiffness and yield point. As the crystallinity decreases the stiffness and yield stress decreases. Rubber, on the other hand, is an amorphous polymer and its molecular straightening leads to a low modulus of elasticity.

Nylon has a tensile strength of over 8000 psi, rubber has a tensile strength of 300 psi. Nylon exhibits 250% breakage during elongation, rubber exhibits 1200%. Nylon has fair moisture resistance, yet rubber absorbs a large amount of water. Nylon has excellent resistance to oil and greases and other organic solvents, rubber has extremely poor resistance. Nylon retains its properties from −75° F. to 230° F., while rubber has a narrow range around room temperature. Nylon's increased strength, resistance to moisture and solvents, and its wide usable temperature range make it the preferred material for this construction.

Another type of polyamide useful in the present invention include other condensation products with recurring amide groups along the polymer chain, such as aramids. Aramids are defined as a manufactured fiber in which at least 85% of the amide (—C(O)—N(H)—) linkages are attached directly to two aromatic hydrocarbon rings. This is distinguished from nylon which has less than 85% of the amide linkages attached directly to the two aromatic rings.

The plastic material may also be aramid fibers which are characterized by high tensile strength and high modulus. Two Aramids that may be useful in the present invention include fiber formed from the polymerization of p-phenylenediamine with terephthaloyl chloride and a less stiff polymer formed from the polymerization of m-phenylenediamine and isophthaloyl chloride.

Aramids demonstrate a very strong resistance to solvents. Aramids have tensile strengths at 250° C. that are exhibited by textile fibers at room temperature.

Also, some thermoset polymers are useful. Polyesters are an example and are long chain synthetic polymers with at least 85% of a dihydric alcohol ester (HOROH) and terephthalic acid (p-HOOCC$_6$H$_4$COOH). Polyester fibers contain both crystalline and non-crystalline regions. Polyesters are resistant to solvents and demonstrate a breaking elongation of 19 to 40%.

Polyimides are polymers containing (CONHCO) and are also useful in the present invention. High temperature stability (up to 700° F.) and high tensile strength of 13,500 psi make polyimides useful as binders in abrasive wheels.

Alternatively, the bundle 40 may comprise filaments having a circular or other transverse cross-section. The length of monofilament, projecting from the holder, is at least ten times greater than the diameter of the cross-section, if round, or thickness if rectangular, and more preferably at least twenty times greater. Again the length of the projection is nonetheless relatively short.

Another similar type of tool and its components are seen in FIGS. 5–9. The tool shown generally at 84 comprises a compact working face of rectangular filament or finger tips 85 which face is formed in a different and less random fashion.

Briefly, the tool is formed from elongated strips shown generally at 86 having ends 87 and 88 and lateral edges 89 and 90. The strip is slit or scored from the lateral edge 90 but not completely transversely as indicated at 92. The unslit edge 89 forms the root of the element. When it is indicated that the strip is slit from the lateral edge, it should not be implied that the edge is formed before the slits. In one process described below, just the opposite is true; the slits are formed before the edge.

Figure 8:
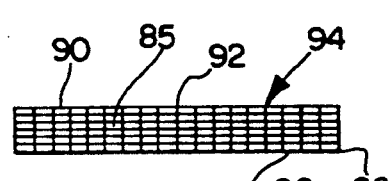
FIG. 8 is a view of the working face of bundle of such strips.
Figure 9:
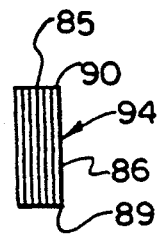
FIG. 9 is an end view of the bundle of FIG. 8.

The cut and partially transversely slit or scored strips are formed into a bundle as seen at 94 in FIGS. 8 and 9 with the slit edges facing in the same direction. As hereinafter described the bundles may be formed by a variety of ways such as by ultrasonic welding. When formed the bundles are secured in the holders by the gel adhesive described below. Such abrasive strips or tapes are described in more detail in the prior application of Tyler et al Ser. No. 471,385, filed Jan. 29, 1990, entitled "Abrasive Tool And Method Of Making", now U.S. Pat. No. 5,155,945.

Figure 6:
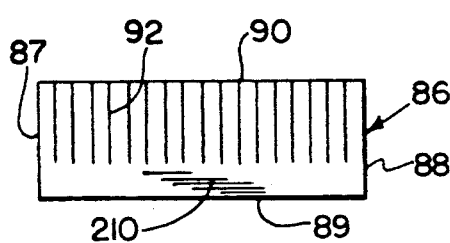
FIG. 6 is a plan view of the slit or scored strip.
Figure 7:
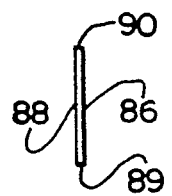
FIG. 7 is an end view of the strip of FIG. 6.

The working face 85 is similar to that formed by the compact tips of the rectangular filaments, but the tips of the bundle as seen in FIG. 8 are laterally in file. The system presents a tool like that of FIGS. 1-4, but having better uniformity and at less cost to make. A strip laterally slit or scored from one edge as seen in FIGS. 6 and 7 is easier to form and handle than an equivalent number of individual filaments. The same is true of the bundle seen in FIGS. 8 and 9. The process also lends itself more readily to automation.

Figure 10:
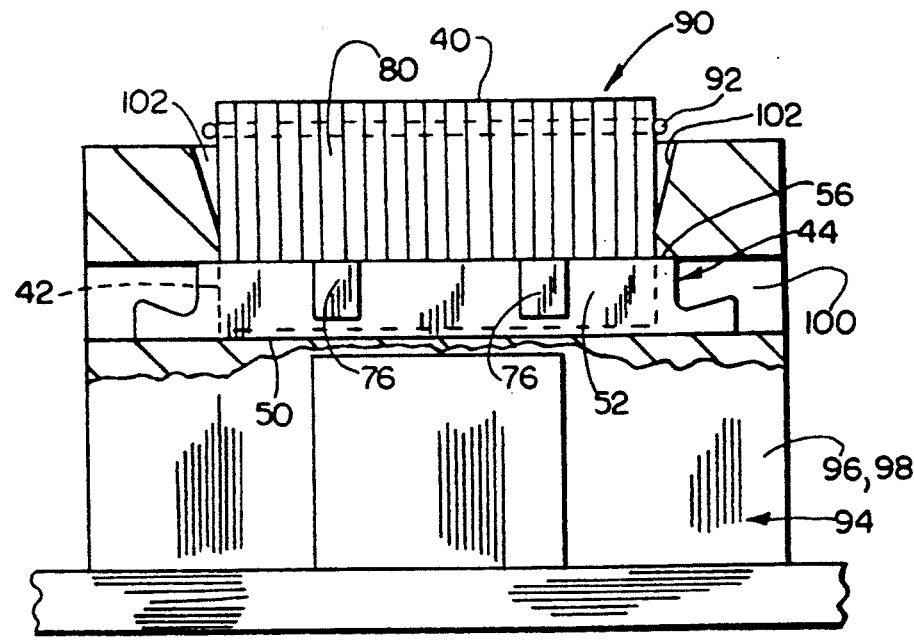
FIG. 10 is a front view of a support jig useful in making a honing tool according to the present invention.
Figures 11, 12, 13, 14:
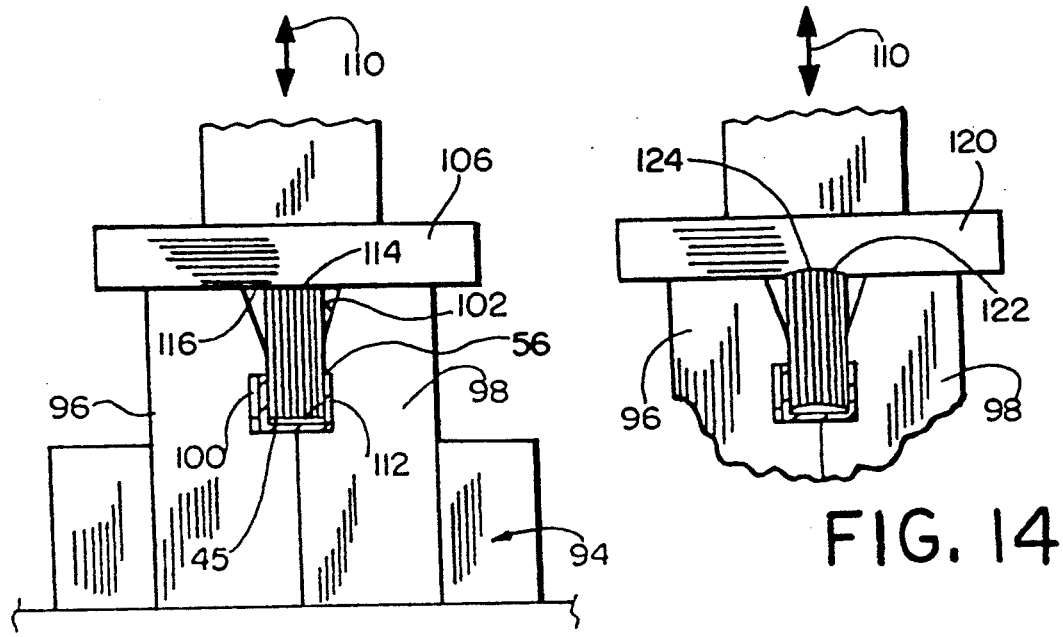
FIG. 11 is a side view of the support jig of FIG. 10 and also a pusher plate.
FIG. 12 illustrates an alternative method of assembling a honing tool according to the present invention which employs a shaping die and longer filaments or strips.
FIG. 13 is an enlarged view of the die as seen along line 13—13 in FIG. 12.
FIG. 14 is a side view of an assembly similar to that of FIG. 11 but using another type of pusher plate to impart a radius to the tool face.

Turning now to FIGS. 10 and 11, the basic steps in making honing tool 20 are illustrated. Although the method is discussed in reference to rectangular filaments 80, a similar method would be used with circular in section filaments and for that matter filaments of other sectional shapes. In making the tool, first a plurality of discrete filaments 80 cut to the same relatively short length are preassembled into a cylindrical bundle. After the bundle 90 is preassembled, it may be temporarily held in shape by an elastic or rubber band 92. The holder 44 is supported in a stationary jig 94, which includes two almost symmetrical parts 96 and 98. The parts 96 and 98 when brought together form a rectangular chamber 100 surrounding the holder 44. Specifically, the chamber 100 surrounds the bottom wall 50, the side walls 52, and also the outer edges of the top wall 56, while leaving the opening of the cup element 42 exposed. Part 96 may have extra clearance to accommodate the spacers 76. The parts also form a funnel 102 above the chamber 100. (See FIG. 12).

A metered amount of gel adhesive 46 is then placed in the bottom of the cup element 42. The adhesive may be inserted through the top of the cup element 42. Alternatively, it may be injected through one or more slots 78 if the holder of FIG. 3 is employed.

As a liquid or gel instant adhesive, it is preferred to employ a cyanoacrylate of low to medium viscosity. It is important that when the adhesive is applied to the bottom wall 45 of the cup element 42 that it uniformly cover that wall and engage all filaments or strips.

Useful with the present invention are alkyl cyanoacrylates having the formula:

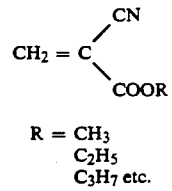

$R = CH_3$
$C_2H_5$
$C_3H_7$ etc.

A preferred cyanoacrylate adhesive is an alkoxy alkyl cyanoacrylate having the formula:

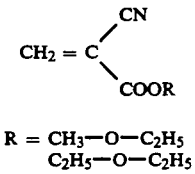

$R = CH_3-O-C_2H_5$
$C_2H_5-O-C_2H_5$

Suitable adhesives are available from Loctite Corporation of Newington, Conn. under the trademark SUPERBONDER® 495, surface insensitive 454 gel, or the trademark BLACK MAX. SUPERBONDER is a registered trademark of Loctite Corporation. BLACK MAX is also a trademark of Loctite Corporation.

The cylindrical bundle may be formed into an oblong or flat shape, manually or otherwise, matching the contour of the cup element 42. (See FIG. 10). Because the band 92 is elastic or rubber, it may remain on the bundle during this shape transformation. The transformed oblong bundle 90 of monofilaments 80 is then placed within the funnel 102 and driven downwardly by a pusher plate 106 driven by a suitable linear actuator such as seen schematically by arrow 110 (FIG. 11). In this manner, the root end face 112 of the bundle 90 is driven into the adhesive 45 which quickly sets bonding each monofilament 80 of the bundle 90 to the bottom wall 45 of the element 42. Because of the viscosity of the adhesive 45 some of the adhesive will penetrate between the monofilaments 80 at the end face 112 bonding the inner end of each monofilament to adjacent monofilaments. The opposite end 114 of the tightly packed bundle then becomes the working face of the tool without subsequent trimming. The flat working surface 116 of the pusher plate 106 results in a flat working face of the tool.

A suitable pressure limit may retract the pressure plate 106. The completed honing tool may then be removed from the support jig 94, and installed, for example, on honing head 22.

Instead of using a pusher plate with a flat working surface, a pusher plate 120 having a convex working surface 122 may be used. (See FIG. 14). When such a pusher plate is used to drive the bundle 90 into the adhesive 45, the resulting end face 124 of the tool is provided with a radius which may correspond to the radius of the bore being honed. Monofilaments 80 of the same length are used, the curved end face 124 being the result of the bonding pattern of the filaments 80 to the bottom of the cup element 42.

It is noted that the oblong or rectangular bundle is further and uniformly compacted when driven into the funnel 102. This results in a uniform tool working face of the tips of the dense compacted filaments. It has been found that the tool has enough aggression to make major topographical changes in the honed surface, and even replace a hard finish hone stone as described in the copending application of Carmichael et al, Ser. No. 07/941,544, filed Sep. 8, 1982 entitled "Honing Process". The compacted tip tool face nonetheless has sufficient characteristics of softness to avoid contamination of the work and still withstand the harsh environment cooling and lubricating fluids used in honing.

The method of manufacture discussed above permits the formation of a honing tool with a finished tool face without a final costly trimming operation. Obviously, the more exotic the abrasive material employed such as polycrystalline diamond, the more costly will be the trimming operation. Without the trimming operation there is no waste of such expensive fill materials. With the present invention the materials are cut one time and pressed into the cup element. Any unevenness is buried inside the cup element and is held firmly by the instant adhesive.

As with the methods described above and with all of the methods disclosed, when the bundle of filaments or strips is driven into a holder having one or more wall slots for injection of the adhesive, some adhesive will be extruded back into the slot. When the adhesive cures the adhesive in the slot mechanically locks the bundle to the holder.

Figure 18:
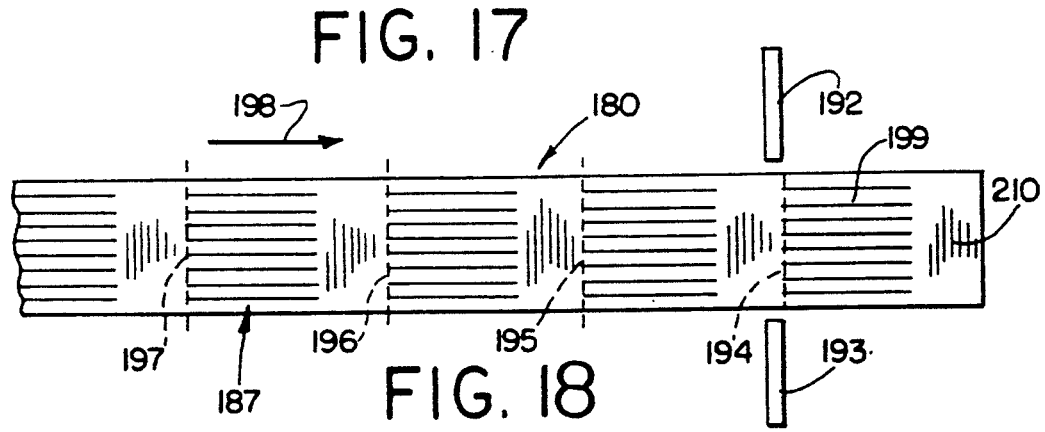
FIG. 18 is a schematic plan view of a continuous strip partially illustrating one process for making a strip bundle form of honing tool.

Another method of making a honing tool according to the present invention is shown in FIGS. 12 and 13. Although strips are illustrated, a long bundle of monofilaments may be employed. The strips are intermittently scored or slit as seen in FIG. 18. In this method, a bundle 130 of monofilaments or parallel strips 132 is preassembled. The strips 132 are preferably of the same length, but are substantially longer than the monofilaments 80 used in the methods described above. For example, for making a tool with an inch or less trim, strips several feet long may be used. The holder 44 is supported in a jig 134, which is similar to the jig 94 except that instead of being stationary, the jig 134 may be moved up and down by a suitable linear actuator as seen schematically by arrow 136.

An intermediate portion of the bundle 130 is inserted through a die 140 which has a hollow center 142 of a contour matching that of the opening of the cup element 42. In this manner, the monofilaments 132 may be neatly and compactly aligned. The bundle 130 is then positioned so that its lower end face 144 is aligned with the cup element 42.

A metered amount of adhesive 45 is then placed in the bottom of the cup element 42, either through the top opening or side slots 78. The jig 134 may be moved up and fixed. Almost simultaneously, a pusher plate 146 is indexed downwardly by a suitable linear actuator illustrated schematically as arrow 150 to cause the end face 144 to engage the adhesive. The bundle is thus pushed through guiding and compacting frame 102. The liquid adhesive 45 quickly sets bonding the end face 144 to the bottom wall of the cup element 42. The bundle 130 is then cut at a height indicated by cutting blades 152 in FIG. 12 adjacent the die. The process is adjusted so that the cut is at the end of the intermediate scoring or slitting as seen in FIG. 18. This cut end then becomes the working face of the honing tool.

Figure 15:
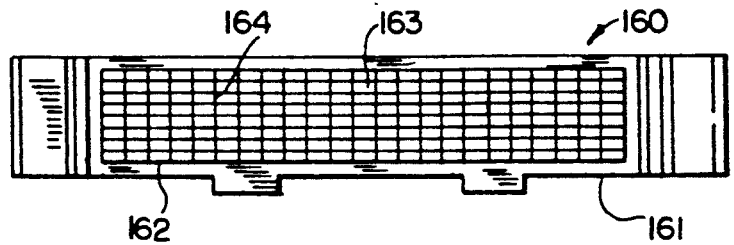
FIG. 15 is an enlarged top plan view of a finished tool with a bundle of strips such as seen in FIG. 8 inserted in a holder.
Figure 16:
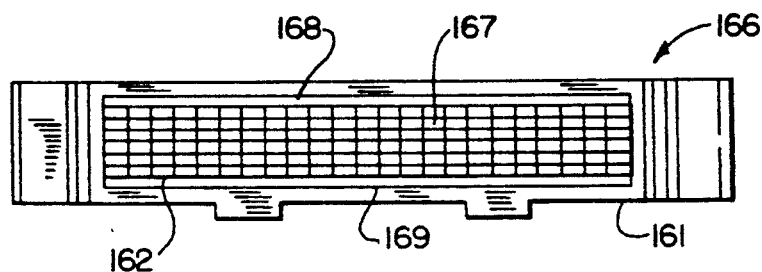
FIG. 16 is a view similar to FIG. 15 but illustrating the two edge strips unslit or scored.
Figure 17:
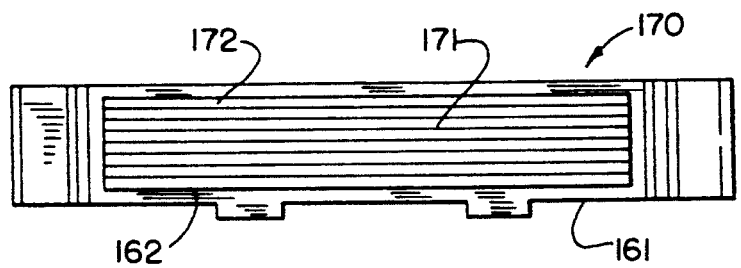
FIG. 17 illustrates another embodiment with none of the strips slit or scored, the working face being the parallel strip edges.

Referring now to FIGS. 15-17 there are illustrated three forms of tool which may be made utilizing the strips, scored or slit, a combination of scored or slit strips with unscored or slit strips, and also a tool wherein the strips are neither scored nor slit.

In FIG. 15 the tool 160 includes the holder 161 with the rectangular cup opening 162 into which a bundle of strips indicated at 163 has been inserted and secured by the noted adhesive. The embodiment illustrated in FIG. 15 illustrates a bundle of such strips, with the projecting ends, or the projecting edges, being scored or slit as indicated at 164. The tool forms a compact working face of the rectangular tips of the fingers thus formed by slitting or scoring each strip from a common edge with the unscored or unslit edge being inserted into the cup of the holder thus forming the root edge or end of the strips. Again depending on the process employed the edge may be formed after the slitting or scoring.

The tool 166 seen in FIG. 16 is secured in the same holder and the tool working face is comprised of the compact rectangular tips of an internal bundle indicated at 167 formed by all of the strips being scored or slit at the common exposed edge. However, the two laterally exterior strips indicated at 168 and 169 are neither scored nor slit and act as a lateral bridle limiting flexure of the fingers of the internal bundle 167 laterally of the length of the holder. The unslit edge strips thus limit the flexure of the fingers at the edges of the center bundle 167 laterally away from the bundle. The degree of flexure permitted may be controlled by recessing the edges of the two lateral strips 168 and 169 slightly from the tips of the central bundle. It is however preferred that the lateral unslit edge strips be a continuation of the working face of the tool wearing away with the tips of the bundle 167.

In FIG. 17 there is illustrated a honing tool 170 made from a bundle of strips seen at 171, none of which are slit or scored at the projecting edge. The face of the tool then becomes the parallel closely packed edges 172 of the bundled strips. While the projecting edges have some lateral flexibility, the degree of flexure is less than the degree of flexure which would be obtained by the individual slit or scored fingers in the FIG. 15 embodiment or in the portion of the FIG. 16 embodiment in the center of the working face.

Of the three tools, the most highly flexible form is that shown in FIG. 15. The least flexible form is that shown in FIG. 17 and the embodiment of FIG. 16 is of intermediate flexibility.

As noted in the prior application of Tyler et al Ser. No. 471,385, now U.S. Pat. No. 5,155,945, when the term "scoring" is used it may constitute a form of slitting or simply an indentation in the surface of the partially crystalline nylon or other plastic such that the strip will fracture upon use of the tool only or partially along the score line. For an indication of the various forms of slitting or scoring which may be employed, reference may be had to the noted Tyler prior application.

Figure 19:
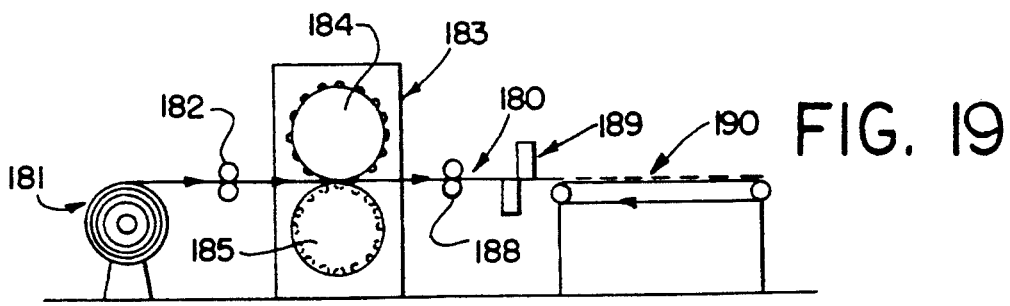
FIG. 19 is a side elevation on a reduced scale of a portion of a continuous process line.

Referring now to FIG. 18 and also FIG. 19 there is illustrated one form of forming the strips which may comprise the bundles seen in FIGS. 5, 8, 9, 15 and 16. It will be appreciated that FIG. 18 is schematic and that normally the continuous strip seen at 180 is wider to form tools such as seen in FIGS. 15 and 16. The continuous strip 180 is an extruded nylon or other plastic material strip which has abrasive material embedded therein homogeneously throughout. The abrasive material typically may be approximately 30% to 45% by weight of the strip. Extrusion is of course a continuous process and substantial lengths of the extruded strip are wound on coils such as seen at 181. The strip is pulled from the coil by a pair of pinch rolls 182 and passed through slitter 183. The slitter may include a roll form top male slitting die 184 and a bottom female die 185 which forms a series of parallel slits in the strip as seen generally at 187 in FIG. 18. The strip is pulled from the slitter by pinch rolls 188 and passes through cut-off 189 onto support table 190.

The length of the strip cut may vary. If a length several feet long is cut, the longer strips are placed together to form a bundle such as the bundle 130 seen in FIGS. 12 and 13. This bundle is then incrementally fed through the die 140 to be cut following insertion into the holder. Such cut becomes the final trimming action and the cut will take place at a common end of each section of parallel slits or scorings. Alternatively, the strip may be cut by cutters 192 and 193 seen in FIG. 18 at the common end of each set of slits as indicated by the phantom lines 194, 195, 196 and 197 as the strip moves in the direction of the arrow 198. Bundles of the cut strip thus formed may be assembled with the flexible fingers indicated at 199 each extending in a common direction. The loose strips in the bundle are then secured together preferably by ultrasonic welding such as shown, for example, in FIG. 20.

Figure 20:
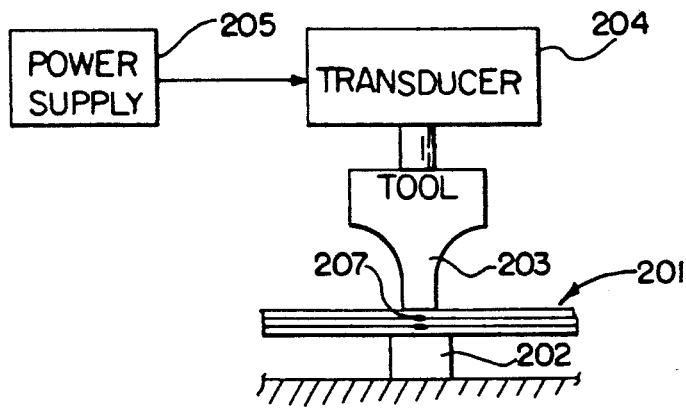
FIG. 20 is a schematic illustration of an ultrasonic welder which may be used to form strip bundles.
Figure 21:
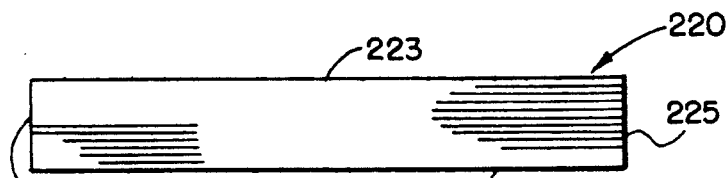
FIG. 21 is a plan view of a relatively thin somewhat oriented extruded abrasive strip prior to slitting.

As seen in FIG. 20, the bundled strips 201 are positioned between an anvil 202 and the ultrasonic welder tool head 203, the welder being driven through a transducer 204 from a power supply 205. The ultrasonic welder will actually fuse the plastic of the laminated strips as indicated at 207. In this manner a bundle of such strips is formed as indicated in FIGS. 8 or 9 and the bundle may then readily be inserted into the holder by the process shown in FIGS. 10 and 11. The ultrasonic welding step will normally fuse the individual strips at one or more locations along the unslit root portion as indicated at 210 in FIG. 18 or FIG. 6.

Referring now to FIGS. 21-25 there is illustrated a method of making a slightly modified tool utilizing strips which are slightly oriented or under tension following the extrusion step. Such a strip is illustrated at 220 in FIG. 21. The strip 220 is initially formed to an indefinite length by the extrusion process noted and is slightly oriented in its lengthwise direction. The length of the strip provides two lateral sides or edges 222 and 223 and of course two ends or widths 224 and 225 when the strip is cut to a finite length. It will be appreciated that the strip may be cut to a finite length either before, during, or after the edge slitting process described below.

Figure 22:
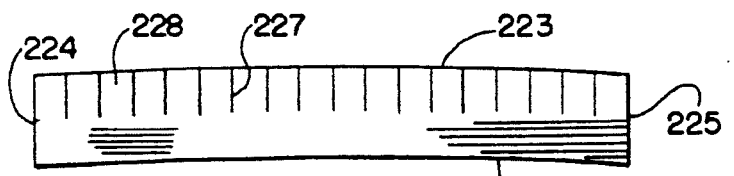
FIG. 22 is a plan view of the strip with one lateral edge laterally slit or scored to its edge and illustrating the slight curvature or camber which results.
Figure 23:
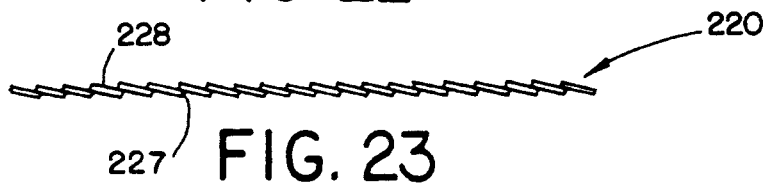
FIG. 23 is a slit edge view of the strip illustrating the sawtooth phenomenon which also results.

When the edge 223 is transversely slit as indicated in FIG. 22 at 227 to form rectangular fingers 228, two noticeable phenomena occur. The first phenomenon is that the slitting 227 relieves the tension along the edge 223 causing the strip to bow or camber so that the edges 222 and 223 in FIG. 22 are slightly arcuate. The second phenomenon is seen in FIG. 23. The tips of the rectangular fingers formed twist uniformly slightly from the plane of the strip to form the saw tooth or serrated edge configuration shown. An associated phenomenon which is perhaps partly due to the slitting operation is that the width of the fingers which would be lengthwise of the strip seem to grow so that the fingers in the saw tooth configuration shown actually slightly overlap at adjoining edges. In the illustrated embodiment, the slits 227 extend approximately half way through the transverse width of the strip and the edge 222 is unslit.

Figure 24:
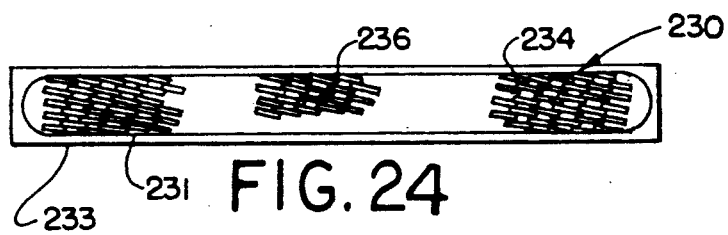
FIG. 24 is a working face view of the tool with the strips bundled and inserted and secured in the holder.

As seen in FIG. 24, the strips 220 may be formed into a bundle as seen at 230 in FIG. 24 and inserted into the elongated cup opening 231 of the holder 233, with the projecting fingers of course all extending beyond the cup element and the tips thereof forming the working face of the honing or abrading tool shown generally at 234.

It is noted that the ends of the cup element are rounded simply because that shape of end wall is easier to form with a routing tool. The strips may be secured together to form the bundle by the ultrasonic welding described below and may be secured into the cup element by the cyanoacrylate gel adhesive described above, which may be inserted through one or more lateral openings in the cup wall.

Because of the camber of the strip indicated in FIG. 2, the tool face will have a similar slightly arcuate configuration and will be somewhat higher in the center of the cup as indicated at 236. It has been found that this does not adversely affect the honing performance of the tool and such slight arcuate configuration from the ends of the tool holder or beam actually make the tool slightly easier to insert into a bore. In any event the tips of the fingers forming the saw tooth effect provide an excellent honing tool.

Figure 25:
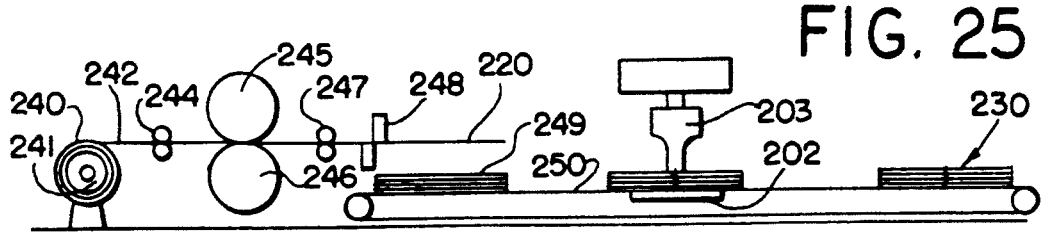
FIG. 25 is a schematic illustration of another continuous process for making such bundles.

Referring now to FIG. 25 there is illustrated one method of making the tool of FIG. 24. After extrusion the abrasive plastic strip is coiled, and a coil of such strip indicated at 240 is positioned on uncoiler 241. The strip from the coil indicated at 242 passes through pinch rolls 244, top male slitting die 245, bottom female slitting die 246, pinch rolls 247 and cut off 248. The cut off 248 cuts the strip to the discrete length 220 which then is guided into a pile or bundle indicated at 249 positioned on conveyor 250. The conveyor transports the loose bundle into the ultrasonic welder and positions it between the tool 203 and the anvil 202. One or more ultrasonic welds may be made to form the bundle along the unslit root portions of the strip and the bundle thus formed is indicated at 230 positioned at the end of the conveyor 250.

The bundle may then be inserted into the holder with the noted instant adhesive covering the bottom wall of the cup element. The purpose of the ultrasonic welder is simply to form the bundle to make the strips easier to handle to be inserted into the cup holder. The adhesive over the bottom surface of the wall of the cup element will not only secure the bundle in the cup element, but will also adhere the root edge of each strip to each other strip. The same is of course true in the bundle of filament embodiments described above.

It will also be appreciated that instead of the roller dies 245 and 246 forming the slits along one edge of the strip, such strips may be formed by press dies opening and closing as the strip is fed therethrough. Such dies may simultaneously form the slits from one lateral edge and also cut the strip to the required discrete length to fit within the holder.

It can now be appreciated that there is provided a simple and easily constructed abrasive filament honing tool. Because the honing element is composed of compact yet discrete filaments or strip edges, the tool affords better aggressive topograph changes and yet is sufficiently soft to avoid contamination of the work surface.

Although the invention has been shown and described with respect to certain preferred embodiments, it is obvious that equivalent alterations and modifications will occur to others skilled in the art upon the reading and understanding of this specification. The present invention includes all such equivalent alterations and modifications, and is limited only by the scope of the following claims.

What is claimed is:

1. A method of forming an abrasive tool comprising the steps of extruding a strip of plastic material having abrasive material homogeneously embedded therein, said strip having a length, width and thickness with lengthwise lateral edges at each side of the width, imparting to the strip an orientation in the lengthwise direction, and then partially, laterally slitting said strip from one lateral edge only to form along said edge a plurality of rectangular fingers, such slitting relieving the orientation along said one edge and causing the ends of the fingers to twist slightly substantially uniformly from alignment with said edge to create a serrated edge useful for abrasion.

2. A method as set forth in claim 1 including the step of forming a bundle of said strips each having a discrete length with said laterally slit edges each facing in the same direction, securing said bundle in a holder with said slit edges protruding, and using said slit edges as the working face of an abrading tool.

3. A method as set forth in claim 2 including the step of ultrasonic welding of said strips to form the bundle.

4. A method as set forth in claim 3 wherein said strips are welded where unslit or scored.

5. A method as set forth in claim 2 including the step of securing said bundle to said holder with an instant adhesive.

6. A method as set forth in claim 5 wherein said adhesive is a gel form of cyanoacrylate.

7. A method as set forth in claim 6 wherein said holder is in the form of a rectangular cup, and said adhesive is injected through ports in the side of the cup.

8. A method as set forth in claim 1 wherein plastic material is selected from a group consisting of nylons, aramids, polyesters, and polyamides.

9. A method as set forth in claim 1 including the step of cutting the strip to a discrete length after such lateral slitting.

10. A method of forming a honing tool comprising the steps of extruding a strip of plastic material having abrasive material homogeneously embedded therein, said strip having a length, width and thickness with lengthwise lateral edges at each side of the width, transversely slitting or scoring said strip from one lateral edge, and securing a plurality of discrete lengths of strip in a cup element with said one edge of each strip projecting from the cup element to form the working face of the honing tool.

11. A method as set forth in claim 10 wherein said one lateral edge is slit to form a multitude of rectangular fingers which form the working face of the tool.

12. A method as set forth in claim 11 wherein the tips of said fingers are slightly offset from the plane of the strip to form a saw tooth edge.

13. A method as set forth in claim 10 wherein said slitting causes said strip to camber slightly whereby the working face of the tool is higher in the center.

14. A method as set forth in claim 10 wherein said plastic is selected from a group consisting of nylons, aramids, polyesters, and polyamides.

15. A method as set forth in claim 11 including the steps of cutting the strips to discrete lengths, forming a bundle of said strips, and securing them in said cup element.

16. A method of forming an abrading tool comprising the steps of extruding a strip of plastic material having abrasive material embedded homogeneously therein, intermittently longitudinally slitting said strip to form spaced groups of parallel slits, forming a tight bundle of such strips with the groups of slits transversely aligned, driving said bundle into an open cup element whereby an unslit portion of the strips may be secured to the bottom of the cup element, and then cutting said bundle at the end of said first group of slits from said cup element to form a trimmed abrading tool, and then repeating the process to form the next abrading tool.

17. A method as set forth in claim 16 wherein said plastic is selected from a group consisting of nylons, aramids, polyesters, and polyamides.

18. A method as set forth in claim 17 wherein said plastic contains from about 30 to about 45 percent abrasive.

19. A method as set forth in claim 18 including the step of securing the strip to the bottom of the cup element with an instant adhesive.

20. A method as set forth in claim 19 wherein said adhesive is a gel cyanoacrylate.

21. A method as set forth in claim 20 wherein said adhesive is injected into the bottom of said cup element through a lateral port.

22. A method as set forth in claim 21 wherein said adhesive hardens in said port to lock the trimmed bundle in the cup element.

23. The method of forming an abrading tool comprising the steps of forming an abrasive plastic strip having abrasive embedded therein homogeneously throughout, forming said strip into a rectangular element having four edges, one of said edges being formed with fingers projecting to that edge, but not the opposite edge, securing said opposite edge to the bottom of a cup holder with said one edge projecting beyond the holder, and using the one edge as the working face of the abrading tool.

24. The method as set forth in claim 23 including the step of forming a bundle of said rectangular elements with said one edge of each element facing in the same direction, and securing the bundle to the bottom of the cup element.

25. A method as set forth in claim 24 including the step of forming said one edge before forming said fingers.

26. A method as set forth in claim 24 including the step of forming said fingers before forming said one edge.

* * * * *